United States Patent
He et al.

(10) Patent No.: US 12,096,456 B2
(45) Date of Patent: Sep. 17, 2024

(54) MULTIPLE PDSCH/PUSCH TRANSMISSION SCHEDULING WITH REPETITION

(71) Applicant: Apple Inc., Cupertino, CA (US)

(72) Inventors: Hong He, San Jose, CA (US); Chunhai Yao, Beijing (CN); Chunxuan Ye, San Diego, CA (US); Dawei Zhang, Saratoga, CA (US); Haitong Sun, Cupertino, CA (US); Jie Cui, San Jose, CA (US); Oghenekome Oteri, San Diego, CA (US); Sigen Ye, Whitehouse, NJ (US); Wei Zeng, Saratoga, CA (US); Weidong Yang, San Diego, CA (US); Yang Tang, Cupertino, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/441,310

(22) PCT Filed: Aug. 5, 2020

(86) PCT No.: PCT/CN2020/107188
§ 371 (c)(1),
(2) Date: Sep. 21, 2021

(87) PCT Pub. No.: WO2022/027348
PCT Pub. Date: Feb. 10, 2022

(65) Prior Publication Data
US 2023/0156736 A1 May 18, 2023

(51) Int. Cl.
*H04W 72/232* (2023.01)
*H04L 1/1829* (2023.01)
(Continued)

(52) U.S. Cl.
CPC ......... *H04W 72/232* (2023.01); *H04L 1/1861* (2013.01); *H04L 1/1893* (2013.01); *H04W 72/12* (2013.01); *H04W 72/231* (2023.01)

(58) Field of Classification Search
CPC . H04W 72/232; H04W 72/12; H04W 72/231; H04W 72/23; H04W 72/0446;
(Continued)

(56) References Cited

U.S. PATENT DOCUMENTS

| 2018/0110057 A1 | 4/2018 | Park et al. |
| 2020/0053798 A1 | 2/2020 | Tsai et al. |

(Continued)

FOREIGN PATENT DOCUMENTS

| CN | 110710318 A | 1/2020 |
| CN | 110913488 A | 3/2020 |

(Continued)

OTHER PUBLICATIONS

PCT Search Report dated Apr. 9, 2021 in connection with PCT Application No. PCT/CN2020/107188.

(Continued)

*Primary Examiner* — Eric Myers
(74) *Attorney, Agent, or Firm* — Eschweiler & Potashnik, LLC (57) ABSTRACT

Methods, circuitries, and systems are disclosed for configuring multiple PDSCH/PUSCH transmission with repetition of each transmission. In one example, a method includes receiving, from a base station, control information that indicates i) time domain resources for communication of at least two physical downlink shared channel (PDSCH) or at least two physical uplink shared channel (PUSCH) transmissions and ii) at least one repetition number indicating a number of times each of the at least two PDSCH/PUSCH transmissions is repeated. The method includes configuring (Continued)

operation to receive the at least two PDSCH transmissions or to transmit the at least two PUSCH transmissions based on the time domain resources and repetition number.

20 Claims, 8 Drawing Sheets

(51) Int. Cl.
*H04L 1/1867* (2023.01)
*H04W 72/12* (2023.01)
*H04W 72/231* (2023.01)

(58) Field of Classification Search
CPC .......... H04W 72/1268; H04W 72/1273; H04L 1/1861; H04L 1/1893; H04L 1/08; H04L 1/1864; H04L 1/1896; H04L 5/0044; Y02D 30/70
See application file for complete search history.

(56) References Cited

U.S. PATENT DOCUMENTS

| | | |
|---|---|---|
| 2020/0322988 A1 | 10/2020 | Fisher-Jeffes et al. |
| 2021/0084683 A1 | 3/2021 | Li et al. |
| 2022/0110152 A1 | 4/2022 | Lim et al. |
| 2022/0159723 A1 | 5/2022 | Jiang |
| 2022/0248466 A1 | 8/2022 | Fan et al. |
| 2022/0295575 A1 | 9/2022 | Sun et al. |
| 2023/0051760 A1 | 2/2023 | Xu et al. |
| 2023/0199833 A1 | 6/2023 | Xu et al. |
| 2023/0262690 A1* | 8/2023 | Medina Acosta ..... H04L 1/1671 370/329 |
| 2023/0354275 A1 | 11/2023 | Moon et al. |

FOREIGN PATENT DOCUMENTS

| | | |
|---|---|---|
| CN | 111148258 A | 5/2020 |
| CN | 111278056 A | 6/2020 |
| CN | 111435884 A | 7/2020 |
| WO | 2018184022 A1 | 10/2018 |
| WO | 2019184943 A1 | 10/2019 |
| WO | 2019214676 A1 | 11/2019 |
| WO | 2020030186 A1 | 2/2020 |
| WO | 2020133190 A1 | 7/2020 |

OTHER PUBLICATIONS

PCT Written Opinion dated Apr. 9, 2021 in connection with PCT Application No. PCT/CN2020/107188.
3rd Generation Partnership Project; Technical Specification Group Radio Access Network; NR; Physical layer procedures for data (Release 16); 3GPP TS 38.214 V16.2.0; Jun. 2020.
3rd Generation Partnership Project; Technical Specification Group Radio Access Network; NR; Radio Resource Control (RRC) protocol specification (Release 16); 3GPP TS 38.331 V16.1.0; Jul. 2020.
PCT Search Report dated Apr. 9, 2021 in connection with PCT Application No. PCT/CN2020/107217.
PCT Written Opinion dated Apr. 9, 2021 in connection with PCT Application No. PCT/CN2020/107217.
Huawei et al; Coexistence and Channel Access for NR Unlicensed Band Operations; 3GPP TSG RAN WG1; Meeting #99; R1-191186; Nov. 22, 2019.
Nokia et al; "Summary of Email Discussion on URLLC/IIOT Operation Support in Unlicensed Spectrum"; 3GPP TSG-RAN; Meeting #88-e; RP-200802; Jul. 3, 2020.
U.S. Appl. No. 17/441,314, filed with the USPTO on Sep. 21, 2021.
International Preliminary Report on Patentability dated Feb. 7, 2023 in connection with Application Serial No. PCT/CN2020/107188.
International Preliminary Report on Patentability dated Feb. 7, 2023 in connection with Application Serial No. PCT/CN2020/107217.
Non-Final Office Action dated Feb. 16, 2024, for U.S. Appl. No. 17/441,314.
European Extended Search Report dated Feb. 6, 2024, for U.S. Application No. EP20947915.
Oppo; "PDCCH enhancement for URLLC"; 3GPP TSG RAN WG1 # 100bis; R1-2001773; Apr. 20, 2020.
Qualcomm Incorporated; "Multi-TRP Enhancements"; 3GPP TSG RAN WG1 # 101-e; R1-2004463; May 25, 2020.
InterDigital Inc.; "PUSCH Enhancements for URLLC"; 3GPP TSG RAN WG1 #100bis; R1-2002305; Apr. 20, 2020.
Final Office Action dated Jul. 29, 2024, for U.S. Appl. No. 17/441,314.
OPPO; "PDCCH enhancement for URLLC"; 7.2.5.1; Discussion and Decision; 3GPP TSG RAN WG1 #100bis; R1-2001773; E-Meeting, Apr. 20-30, 2020.
InterDigital Inc.; "PUSCH Enhancements for URLLC"; 7.2.5.3; Discussion and Decision; 3GPP TSG RAN WG1 #100bis; R1-2002305; e-Meeting, Apr. 20-30, 2020.
Qualcomm Incorporated; "Multi-TRP Enhancements"; 7.2.6.2; Discussion/Decision; 3GPP TSG RAN WG1 #101-e; R1-2004463; May 25-Jun. 5, 2020.

* cited by examiner

```
-- Multi-PDSCH and repetition ASN.1
PDSCH-TimeDomainResourceAllocationList-r17 ::= SEQUENCE (SIZE(1..maxNrofDL-Allocations-r16))    DL TDRA TABLE
                                                OF PDSCH-TimeDomainResourceAllocationCombination-r17

PDSCH-TimeDomainResourceAllocationCombination-r17 ::= SEQUENCE {
   K0                   INTEGER (0..32)              OPTIONAL, -- Need S
   PDSCH-TimeDomainResourceAllocationList ::= SEQUENCE (SIZE(1..maxNrofDL-TransmissionsWithSingleTDRAField-r17))
                                                OF PDSCH-TimeDomainResourceAllocation-r17
   numberOfRepetitions-r16     ENUMERATED {n1, n2, n4, n7, n12, n16},
   ...
}                                                                                              ROW
PUSCH-TimeDomainResourceAllocation-r17   ::= SEQUENCE {
   mappingType-r16          ENUMERATED {typeA, typeB}       OPTIONAL,            CELL
   startSymbol-r16          INTEGER (0..13)                 OPTIONAL,
   length-r16               INTEGER (1..14)                 OPTIONAL,
}

-- Multi-PUSCH and repetition ASN.1
PUSCH-TimeDomainResourceAllocationList-r17 ::= SEQUENCE (SIZE(1..maxNrofUL-Allocations-r16))    UL TDRA TABLE
                                                OF PUSCH-TimeDomainResourceAllocationCombination-r17

PUSCH-TimeDomainResourceAllocationCombination-r17 ::= SEQUENCE {
   k2                   INTEGER (0..32)              OPTIONAL, -- Need S
   PUSCH-TimeDomainResourceAllocationList ::= SEQUENCE (SIZE(1.. maxNrofUL-TransmissionsWithSingleTDRAField-r17))
                                                OF PUSCH-TimeDomainResourceAllocation-r17
   numberOfRepetitions-r16     ENUMERATED {n1, n2, n4, n7, n12, n16},
   ...
}                                                                       CELL   ROW
PUSCH-TimeDomainResourceAllocation-r17   ::= SEQUENCE {
   mappingType-r16          ENUMERATED {typeA, typeB}       OPTIONAL, -- Cond RepTypeA
   startSymbolAndLength-r16 INTEGER (0..127)                OPTIONAL, -- Cond RepTypeA
   startSymbol-r16          INTEGER (0..13)                 OPTIONAL, -- Cond RepTypeB
   length-r16               INTEGER (1..14)                 OPTIONAL, -- Cond RepTypeB
...}
-- ASN1STOP
```

```
-- Multi-PDSCH and repetition ASN.1                                                    DL TDRA TABLE
PDSCH-TimeDomainResourceAllocationList-r17 ::=  SEQUENCE (SIZE(1..maxNrofDL-Allocations-r16))
                                    OF PDSCH-TimeDomainResourceAllocationCombination-r17
PDSCH-TimeDomainResourceAllocationCombination-r17 ::=  SEQUENCE {
    K0              INTEGER (0..32)              OPTIONAL,  -- Need S
    PDSCH-TimeDomainResourceAllocationList ::= SEQUENCE (SIZE(1..maxNrofDL-TransmissionsWithSingleTDRAField-r17))
                                    OF  PDSCH-TimeDomainResourceAllocation-r17
    ...
}
PUSCH-TimeDomainResourceAllocation-r17   ::= SEQUENCE {                                ROW
    mappingType-r16       ENUMERATED {typeA, typeB}      OPTIONAL,
    startSymbol-r16       INTEGER (0..13)                OPTIONAL,             CELL
    length-r16            INTEGER (1..14)                OPTIONAL,
    numberOfRepetitions-r16    ENUMERATED {n1, n2, n4, n7, n12, n16},
    ...
}
-- Multi-PUSCH and repetition ASN.1
PUSCH-TimeDomainResourceAllocationList-r17 ::=  SEQUENCE (SIZE(1..maxNrofUL-Allocations-r16))    UL TDRA TABLE
                                    OF PUSCH-TimeDomainResourceAllocationCombination-r17
PUSCH-TimeDomainResourceAllocationCombination-r17 ::=  SEQUENCE {
    k2              INTEGER (0..32)              OPTIONAL,  -- Need S
    PUSCH-TimeDomainResourceAllocationList ::= SEQUENCE (SIZE(1..maxNrofUL-TransmissionsWithSingleTDRAField-r17))
                                    OF  PUSCH-TimeDomainResourceAllocation-r17
    ...
}
PUSCH-TimeDomainResourceAllocation-r17   ::= SEQUENCE {
    mappingType-r16          ENUMERATED {typeA, typeB}      OPTIONAL,  -- Cond RepTypeA       ROW
    startSymbolAndLength-r16    INTEGER (0..127)            OPTIONAL,  -- Cond RepTypeA
    startSymbol-r16          INTEGER (0..13)                OPTIONAL,  -- Cond RepTypeB
    length-r16               INTEGER (1..14)                OPTIONAL,  -- Cond RepTypeB       CELL
    numberOfRepetitions-r16    ENUMERATED {n1, n2, n4, n7, n12, n16},
    ...}
-- ASN1STOP
```

MULTIPLE PDSCH/PUSCH TRANSMISSION SCHEDULING WITH REPETITION

REFERENCE TO RELATED APPLICATIONS

This application is a National Phase entry application of International Patent Application No. PCT/CN2020/107188 filed Aug. 5 2020, entitled "MULTIPLE PDSCH/PUSCH TRANSMISSION SCHEDULING WITH REPETITION", the contents of which are herein incorporated by reference in their entirety.

BACKGROUND

Some aspects of data communication between a user equipment (UE) device (hereinafter "UE") and a base station (BS) (e.g., a gNB, a node of a serving cell, a network node, an eNB, and so on) are configured by radio resource control (RRC) signaling. Other aspects of data communication are dynamically configured by control information carried by the physical downlink control channel (PDCCH) and the physical uplink control channel (PUCCH), respectively.

BRIEF DESCRIPTION OF THE DRAWINGS

Some examples of circuits, apparatuses and/or methods will be described in the following by way of example only. In this context, reference will be made to the accompanying figures.

FIG. 2C illustrates an exemplary Abstract Syntax Notation One (ASN.1) that enables simultaneous multi-PDSCH/PUSCH transmission scheduling with repetition as illustrated in FIGS. 2A and 2B.

FIG. 3C illustrates an exemplary Abstract Syntax Notation One (ASN.1) that enables simultaneous multi-PDSCH/PUSCH transmission scheduling with repetition as illustrated in FIGS. 3A and 3B.

DETAILED DESCRIPTION

The present disclosure is described with reference to the attached figures. The figures are not drawn to scale and they are provided merely to illustrate the disclosure. Several aspects of the disclosure are described below with reference to example applications for illustration. Numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the selected present disclosure.

Figure 1:
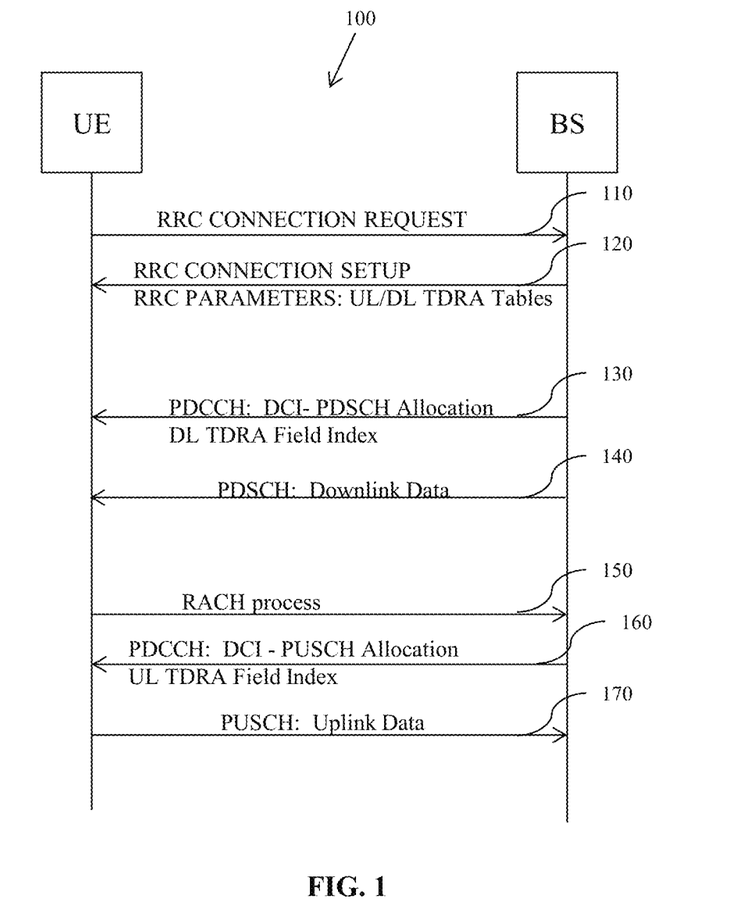
FIG. 1 is a flow diagram outlining an example of PDSCH/PUSCH configuration using RRC signaling and PUCCH/PDCCH.

FIG. 1 is a message flow diagram that provides an overview of a configuration process 100 that sets up data transfer between an UE and a BS in an exemplary context. When the UE first connects to the radio access network (RAN) or seeks to re-enter an RRC CONNECTED state, the UE transmits an RRC CONNECTION REQUEST message at 110. At 120 the UE receives, in response, an RRC CONNECTION SETUP message that includes RRC parameters defining many aspects of the UE's communication with the BS. For example, the RRC parameters may include uplink (UL) and downlink (DL) time domain resource allocation (TDRA) tables that define several TDRA configuration options for UL and DL communication, respectively. The term "table" is used here conceptually, to describe any ordered manner of representing or communicating sets of parameter values. In the table representation, each parameter corresponds to a "column" and each set of parameter values are arranged in a "row" identified by a unique index value.

When the network has data to transmit to the UE, at 130 the BS transmits downlink control information (DCI) to the UE by way of the PDCCH. The DCI includes a DL TDRA Field Index that selects one of the DL TDRA configuration options (e.g., a row) from the DL TDRA table. The UE reads the DL TDRA table to identify the selected TDRA configuration and determine which PDSCH resources the UE should use to receive data from the BS. AT 140, the UE receives the data on the PDSCH resources identified by the TDRA configuration.

When the UE has data to transmit to the network, the UE may employ a random access channel (RACH) process to synchronize with the BS for communication and communicate a scheduling request. At 160 the BS transmits downlink control information (DCI) and PUSCH allocation to the UE by way of the PDCCH. The DCI includes an UL TDRA Field Index that selects one of the UL TDRA configuration options (e.g., a row) from the UL TDRA table. The UE reads the UL TDRA table to identify the selected TDRA configuration and determine which PUSCH resources the UE should use to transmit data to the BS. AT 170, the UE transmits the data on the PUSCH resources identified by the TDRA configuration.

The TDRA configuration options provide communication opportunities in variety of circumstances. For example, some TDRA configurations define multiple PDSCH/PUSCH allocations in a single configuration (e.g., row). Such "multi-PDSCH/PUSCH" configurations allow for several PDSCH/PUSCH transmissions to be allocated with a single PDCCH/

PUCCH message, reducing the number of PDCCH/PUCCH messages that are exchanged when a relatively large amount of data is being transferred. This may be beneficial, for example, in unlicensed spectrum (e.g., New Radio Unlicensed NR-U) when a listen-before-talk (LBT) process is performed to confirm a clear channel prior to each PDCCH/PUCCH message.

Other TDRA configuration options include a number of repetitions for a given PDSCH/PUSCH transmission. In one example, the PDSCH/PUSCH is re-transmitted, in contiguous time resources, for the specified number of repetitions. These TDRA configurations may be beneficial in ultra-reliability low-latency communication (ULLRC) in which repeated transmission of the same data increases the likelihood of its successful reception.

While in 3GPP Release 16, multi-PDSCH/PUSCH TDRA configurations and also separate TDRA configurations that specify a number of repetitions is provided as captured in 3GPP TS 38.331 version 16.1, there is no mechanism for simultaneous allocation of time domain resources to support both multiple PDSCH/PUSCH transmission and repetitions per PDSCH/PUSCH transmission. Described herein are techniques for allocating time domain resources for multi-PDSCH/PUSCH transmission with repetition for each scheduled PDSCH or PUSCH transmission the multi-PDSCH/PUSCH.

Figure 2A:
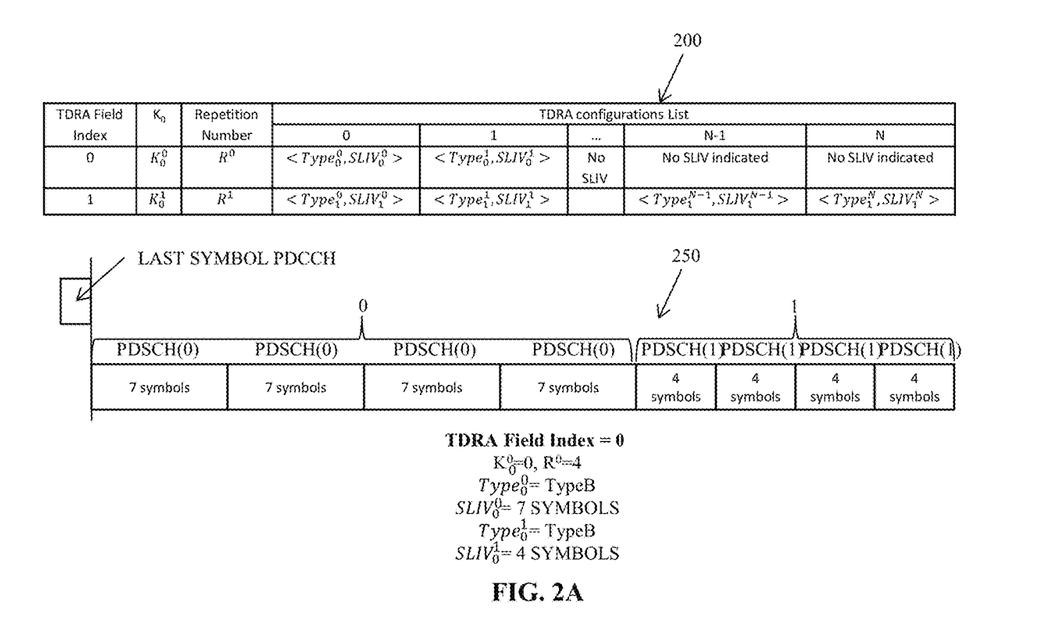
FIG. 2A illustrates an exemplary time domain resource allocation table for downlink reception that includes a column for a number of repetitions and an outline of multiple PDSCH receptions that result from configuration according to a selected row of the table, in accordance with various aspects described.

FIG. 2A illustrates an exemplary DL TDRA table 200 that includes a row for each of multiple TDRA configurations (while only two rows are shown, many more will likely be present). Each row has a unique TDRA field index value that is used to select the TDRA configuration defined in the row. K0 is a latency-based parameter that defines a number of symbols to occur between a last symbol of a PDCCH and a first symbol of a PDSCH transmission that is scheduled by the PDCCH. A repetition number defines a number of times each PDSCH transmission is to be repeated. In one example, the repetitions of the PDSCH transmission occur in contiguous time resources.

The TDRA configurations List includes N columns, where N is the maximum number of PDSCH transmissions that can be scheduled by a single PDCCH. Each cell of the TDRA configurations List indicates a mappingType and startSymbolandLength (SLIV). The mapping type, which in one example can be either TypeA or TypeB, defines, for example, a location of demodulation reference signals (DMRS) within the PDSCH. The SLIV defines a starting symbol and length in symbols of the PDSCH. The number of PDSCH transmissions scheduled by a given TDRA configuration is signaled by the number of valid SLIVs in the row. For example, according to the DL TDRA table 200 two PDSCH transmissions are scheduled by each DCI that identifies TDRA field index 0.

An exemplary time resource allocation 250 is illustrated in FIG. 2A in which the following parameter values were assigned by RRC signaling: $K_0^0=0$, $R^0=4$, $Type_0^0=Type_0^1=TypeB$, $SLIV_0^0=7$, $SLIV_0^1=4$. It can be seen that transmission of PDSCH(0) begins immediately after the last symbol of the PDCCH that included the DCI specifying TDRA field index 0 due to $K_0^0$ being set to 0. Time domain resources are allocated for two PDSCH transmissions (PDSCH0 and PDSCH1) using a single DCI format. 7 symbols are allocated for each PDSCH(0) transmission and 4 symbols are allocated for each PDSCH(1) transmission. In addition, the PDSCH(0) and PDSCH(1) are both repeated 4 times in contiguous time domain resources. This is because the "row level" repetition value $R^0$ is set to 4, meaning that this repetition number applies to all the PDSCH(0) and PDSCH(1) that are scheduled by the row indicated by the corresponding field in the DCI format.

Figure 2B:
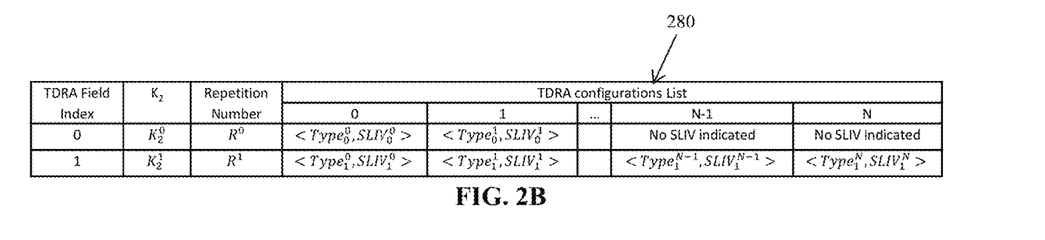
FIG. 2B illustrates an exemplary time domain resource allocation table for uplink transmission that includes a column for a number of repetitions, in accordance with various aspects described.

FIG. 2B illustrates an exemplary UL TDRA table 280 that supports allocation of multiple PUSCH transmissions with a single PDCCH and also repetition of each scheduled PUSCH transmission. The parameters in the UL TDRA table 280 are analogous to those of the DL TDRA table 200 and the description will not be repeated here. It is noted that K2 is a latency-based parameter that defines a number of symbols to occur between a last symbol of a PDCCH and a first symbol of a PUSCH transmission that is scheduled by the PDCCH. It can be seen that in the multi-PDSCH/PUSCH transmission with repetition configuration technique outlined in FIGS. 2A and 2B the same repetition number is applied to all PDSCH/PUSCH transmissions scheduled by a row.

FIG. 2C is an ASN.1 listing that configures multi-PDSCH/PUSCH transmission with repetition as illustrated in FIGS. 2A and 2B. The PDSCH-TimeDomanResourceAllocationList corresponds to the DL TDRA Table and includes a number of rows. Each row corresponds to a PDSCH-TimeDomainAllocationCombination. Each PDSCH-TimeDomainAllocationCombination includes a value for K0 and R (repetition number) as well as a sequence of PDSCH-TimeDomainAllocationAllocation (each corresponding to a separate PDSCH scheduling of possibly multiple PDSCH transmissions scheduled in the row (e.g., a single cell of the DL TDRA table). The UL TDRA table is also configured in the ASN.1 in a similar manner. It can be seen that the numberofRepetitions parameter is configured on a "per row" basis and as such will be applied to each PDSCH/PUSCH transmission scheduled in a row, as illustrated in FIGS. 2A and 2B.

Figure 3A:
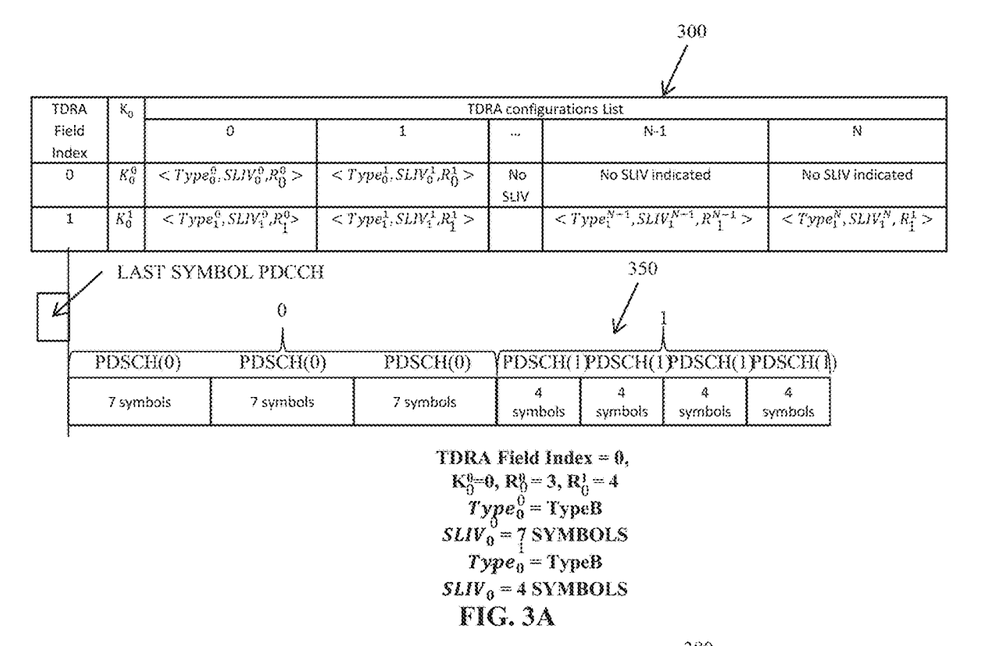
FIG. 3A illustrates an exemplary time domain resource allocation table for downlink reception that individually configures repetition for PDSCH; and an outline of multiple PDSCH receptions that result from configuration according to a selected row of the table, in accordance with various aspects described.

FIG. 3A illustrates an exemplary DL TDRA table 300 in which a different number of repetitions may be configured for different PDSCH transmissions scheduled by the same TDRA configuration (e.g., a single row). Each row has a unique TDRA field index value that is used to select the TDRA configuration defined in the row. K0 is a latency-based parameter that defines a number of symbols to occur between a last symbol of a PDCCH and a first symbol of a PDSCH transmission that is scheduled by the PDCCH.

The TDRA configurations List includes N columns, where N is the maximum number of PDSCH transmissions that can be scheduled by a single PDCCH. Each cell of the TDRA configurations List indicates a mappingType, SLIV, and repetition number R. The mapping type, which in one example can be either TypeA or TypeB, defines, for example, a location of demodulation reference signals (DMRS) within the PDSCH. The SLIV defines a starting symbol and length in symbols of the PDSCH. The number of PDSCH transmissions scheduled by a given TDRA configuration is signaled by the number of valid SLIVs in the row. For example, according to the DL TDRA table 300 two PDSCH transmissions are scheduled by each DCI that identifies TDRA field index 0. The repetition number defines the number of repetitions of the PDSCH transmissions scheduled by the particular cell of the TDRA table.

An exemplary time resource allocation 350 is illustrated in FIG. 3A in which the following parameter values were assigned by RRC signaling: $K_0^0=0$, $R_0^0=3$, $R_0^1=4$, $Type_0^0=Type_0^1=TypeB$, $SLIV_0^0=7$, $SLIV_0^1=4$. It can be seen that transmission of PDSCH(0) begins immediately after the last symbol of the PDCCH that included the DCI specifying TDRA field index 0 due to $K_0^0$ being set to 0. Resources are allocated for two PDSCH transmissions (PDSCH(0) and PDSCH (1)) with 7 symbols allocated for each PDSCH(0) and 4 symbols allocated for each PDSCH (1). PDSCH(0) is repeated 3 times in contiguous time domain resources because the "cell level" repetition value $R_0^0$ is set to 3. PDSCH(1) is repeated 4 times in contiguous time domain resources because the "cell level" repetition value $R_0^1$ is set to 4.

Figure 3B:
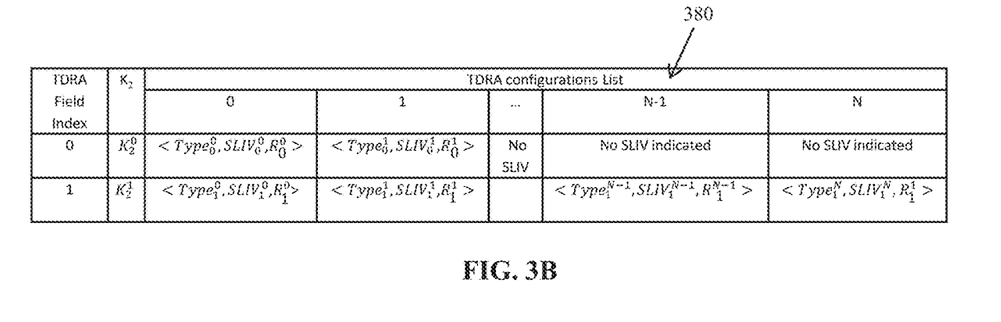
FIG. 3B illustrates an exemplary time domain resource allocation table for uplink transmission, in accordance with various aspects described.

FIG. 3B illustrates an exemplary UL TDRA table 380 that supports allocation of multiple PUSCH transmissions with a single PUCCH and also repetition of each PUSCH transmission. The parameters in the UL TDRA table 380 are analogous to those of the DL TDRA table 300 and the description will not be repeated here. It is noted that K2 is a latency-based parameter that defines a number of symbols to occur between a last symbol of a PUCCH and a first symbol of a PUSCH that is scheduled by the PUCCH. It can be seen that in the multi-PDSCH/PUSCH transmission with repetition configuration technique outlined in FIGS. 3A and 3B a different repetition number may be applied to individual PDSCH/PUSCH transmission scheduled by a row.

FIG. 3C is an ASN.1 listing that configures multi-PDSCH/PUSCH transmission with repetition as illustrated in FIGS. 3A and 3B. The PDSCH-TimeDomanResourceAllocationList corresponds to the DL TDRA Table and includes a number of rows. Each row corresponds to a PDSCH-TimeDomainAllocationCombination. Each PDSCH-TimeDomainAllocationCombination includes a value for K0 as well as a sequence of PDSCH-TimeDomainAllocationAllocation (each corresponding to a separate PDSCH scheduling of possibly multiple PDSCH transmissions scheduled in the row (e.g., a single cell of the DL TDRA table). Each TimeDomainAllocationAllocation includes its own numberofRepetitions. The UL TDRA table is also configured in the ASN.1 in a similar manner. It can be seen that the numberofRepetitions parameter is configured on a "per cell" basis and as such different numbers of repetitions can be applied to each PDSCH scheduled in a row, as illustrated in FIGS. 3A and 3B.

Following are several flow diagrams outlining example methods. In this description and the appended claims, use of the term "determine" with reference to some entity (e.g., parameter, variable, and so on) in describing a method step or function is to be construed broadly. For example, "determine" is to be construed to encompass, for example, receiving and parsing a communication that encodes the entity or a value of an entity. "Determine" should be construed to encompass accessing and reading memory (e.g., lookup table, register, device memory, remote memory, and so on) that stores the entity or value for the entity. "Determine" should be construed to encompass computing or deriving the entity or value of the entity based on other quantities or entities. "Determine" should be construed to encompass any manner of deducing or identifying an entity or value of the entity.

As used herein, the term identify when used with reference to some entity or value of an entity is to be construed broadly as encompassing any manner of determining the entity or value of the entity. For example, the term identify is to be construed to encompass, for example, receiving and parsing a communication that encodes the entity or a value of the entity. The term identify should be construed to encompass accessing and reading memory (e.g., device queue, lookup table, register, device memory, remote memory, and so on) that stores the entity or value for the entity.

As used herein, the term select when used with reference to some entity or value of an entity is to be construed broadly as encompassing any manner of determining the entity or value of the entity from amongst a plurality or range of possible choices. For example, the term select is to be construed to encompass accessing and reading memory (e.g., lookup table, register, device memory, remote memory, and so on) that stores the entities or values for the entity and returning one entity or entity value from amongst those stored. The term select is to be construed as applying one or more constraints or rules to an input set of parameters to determine an appropriate entity or entity value. The term select is to be construed as broadly encompassing any manner of choosing an entity based on one or more parameters or conditions.

As used herein, the term derive when used with reference to some entity or value of an entity is to be construed broadly. "Derive" should be construed to encompass accessing and reading memory (e.g., lookup table, register, device memory, remote memory, and so on) that stores some initial value or foundational values and performing processing and/or logical/mathematical operations on the value or values to generate the derived entity or value for the entity. "Derive" should be construed to encompass computing or calculating the entity or value of the entity based on other quantities or entities. "Derive" should be construed to encompass any manner of deducing or identifying an entity or value of the entity.

Figure 4:
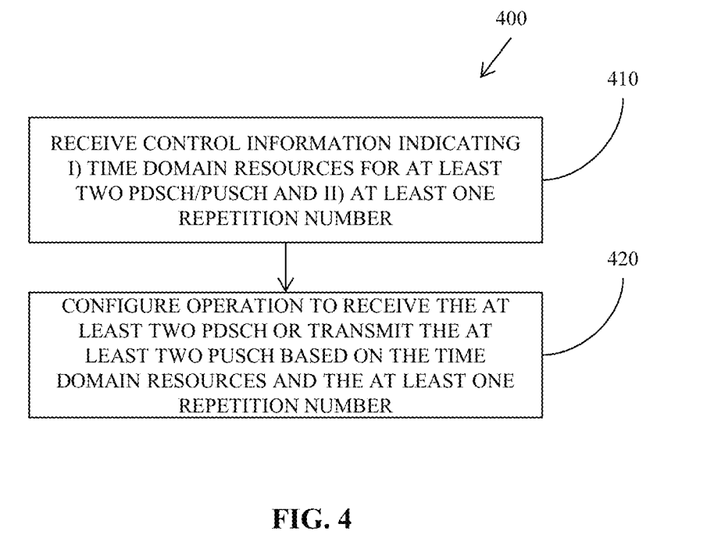
FIG. 4 is a flow diagram illustrating an exemplary UE method for performing multi-PDSCH/PUSCH transmission with repetition, according to various aspects disclosed.

FIG. 4 depicts a flow diagram outlining a method 400 to be performed by a UE. The method includes, at 410, receiving, from a base station, control information that indicates i) time domain resources for communication of at least two physical downlink shared channel (PDSCH) or at least two physical uplink shared channel (PUSCH) transmissions and ii) at least one repetition number indicating a number of times each of the at least two PDSCH/PUSCH transmissions is repeated. Examples of configuration information are illustrated in FIGS. 2A, 2C, 3A, and 3C. The method includes, at 420, configuring operation to receive the at least two PDSCH transmissions or to transmit the at least two PUSCH transmissions based on the time domain resources and repetition number.

In one example, the method 400 includes identifying a single repetition number in the control information, wherein the single repetition number is associated with all of the at least two PDSCH/PUSCH transmissions; and configuring operation to receive the at least two PDSCH, each repeated based on the single repetition number, or to transmit the at least two PUSCH transmissions, each repeated based on the single repetition number. An illustration of this example can be found in FIGS. 2A-2C.

In another example, the method 400 includes identifying at least two repetition numbers in the control information, wherein each respective repetition number is associated with a respective one of the at least two PDSCH/PUSCH transmissions; and configuring operation to receive the at least two PDSCH transmissions, each repeated based on the associated repetition number, or to transmit the at least two PUSCH transmissions, each repeated based on the associated repetition number. An illustration of this example can be found in FIGS. 3A-3C.

Figure 5:
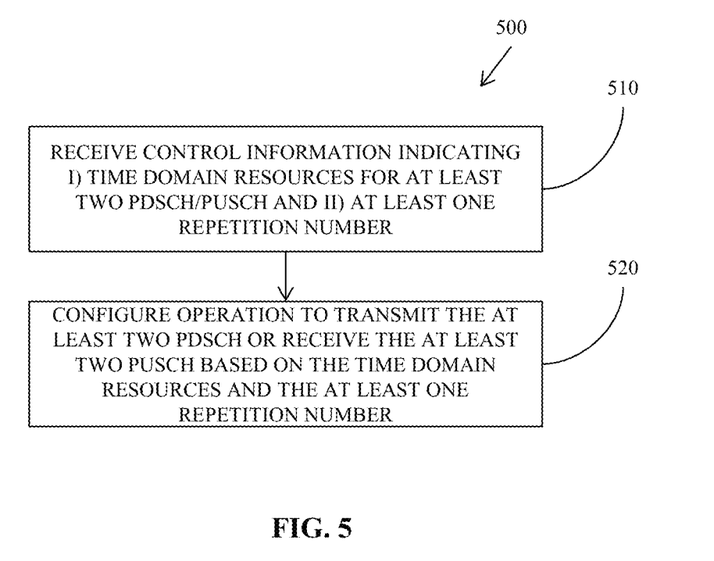
FIG. 5 is a flow diagram illustrating an exemplary BS method for performing multi-PDSCH/PUSCH transmission with repetition, according to various aspects disclosed.

FIG. 5 depicts a flow diagram outlining a method 400 to be performed by a BS. The method includes, at 510, transmitting, to a user equipment wireless communication device (UE), control information that indicates i) time domain resources for communication of at least two physical downlink shared channel (PDSCH) or at least two physical uplink shared channel (PUSCH) transmissions and ii) at least one repetition number indicating a number of times each of the at least two PDSCH/PUSCH transmissions is repeated. Examples of configuration information are illustrated in FIGS. 2A, 2C, 3A, and 3C. At 520 the method includes configuring operation to transmit the at least two PDSCH transmissions or to receive the at least two PUSCH transmissions based on the time domain resources and repetition number.

In one example, the method 500 includes identifying a single repetition number in the control information, wherein the single repetition number is associated with all of the at least two PDSCH/PUSCH transmissions; and configuring operation to transmit the at least two PDSCH, each repeated based on the single repetition number, or to receive the at least two PUSCH transmissions, each repeated based on the single repetition number. An illustration of this example can be found in FIGS. 2A-2C.

In another example, the method 500 includes identifying at least two repetition numbers in the control information, wherein each respective repetition number is associated with a respective one of the at least two PDSCH/PUSCH transmissions; and configuring operation to transmit the at least two PDSCH transmission, each repeated based on the associated repetition number, or to receive the at least two PUSCH transmission, each repeated based on the associated repetition number. An illustration of this example can be found in FIGS. 3A-3C.

Figure 6:
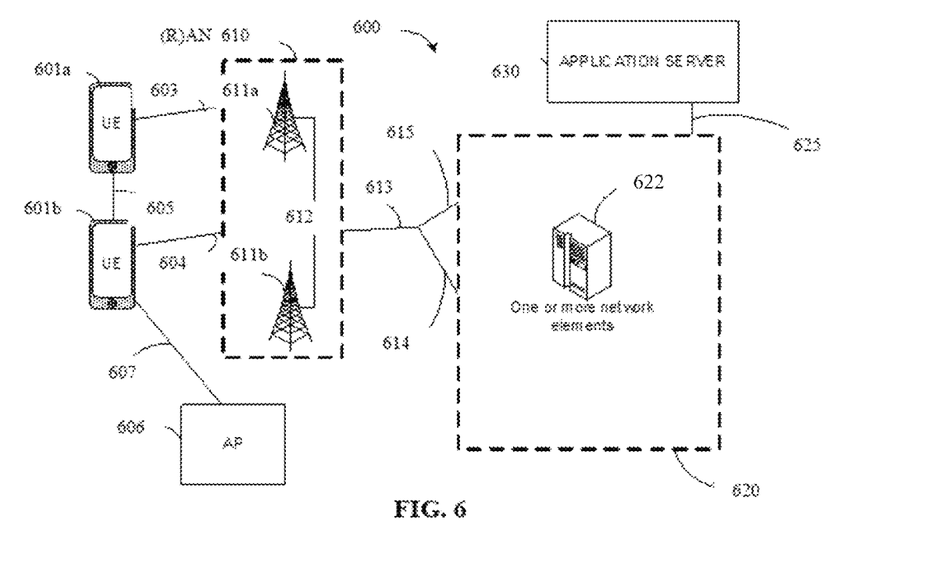
FIG. 6 illustrates an example communication network, in accordance with various aspects disclosed.

FIG. 6 illustrates an example architecture of a system 600 of a communication network, in accordance with various embodiments. The following description is provided for an example system 600 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 702.16 protocols (e.g., WMAN, WiMAX, etc.), or the like.

As shown by FIG. 6, the system 600 includes UE 601*a* and UE 601*b* (collectively referred to as "UEs 601" or "UE 601"). In this example, UEs 601 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 601 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 601 may be configured to connect, for example, communicatively couple, with a RAN 610. In embodiments, the RAN 610 may be an NG RAN or a 5G RAN, an E-UTRAN, or a legacy RAN, such as a UTRAN or GERAN. As used herein, the term "NG RAN" or the like may refer to a RAN 610 that operates in an NR or 5G system 600, and the term "E-UTRAN" or the like may refer to a RAN 610 that operates in an LTE or 4G system 600. The UEs 601 utilize connections (or channels) 603 and 604, respectively, each of which comprises a physical communications interface or layer (discussed in further detail below).

In this example, the connections 603 and 604 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 601 may directly exchange communication data via a ProSe interface 605. The ProSe interface 605 may alternatively be referred to as a SL interface 605 and may comprise one or more logical channels, including but not limited to a PSCCH, a PSSCH, a PSDCH, and a PSBCH.

The UE 601*b* is shown to be configured to access an AP 606 (also referred to as "WLAN node 606," "WLAN 606," "WLAN Termination 606," "WT 606" or the like) via connection 607. The connection 607 can comprise a local wireless connection, such as a connection consistent with any IEEE 702.11 protocol, wherein the AP 606 would comprise a wireless fidelity (Wi-Fi®) router. In this example, the AP 606 is shown to be connected to the Internet without connecting to the core network of the wireless system (described in further detail below). In various embodiments, the UE 601*b*, RAN 610, and AP 606 may be configured to utilize LWA operation and/or LWIP operation. The LWA operation may involve the UE 601*b* in RRC_CONNECTED being configured by a RAN node 611*a-b* to utilize radio resources of LTE and WLAN. LWIP operation may involve the UE 601*b* using WLAN radio resources (e.g., connection 607) via IPsec protocol tunneling to authenticate and encrypt packets (e.g., IP packets) sent over the connection 607. IPsec tunneling may include encapsulating the entirety of original IP packets and adding a new packet header, thereby protecting the original header of the IP packets.

The RAN 610 can include one or more AN nodes or RAN nodes 611*a* and 611*b* (collectively referred to as "RAN nodes 611" or "RAN node 611") that enable the connections 603 and 604. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 611 that operates in an NR or 5G system 600 (for example, a gNB), and the term "E-UTRAN node" or the like may refer to a RAN node 611 that operates in an LTE or 4G system 600 (e.g., an eNB). According to various embodiments, the RAN nodes 611 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

According to various embodiments, the UEs 601 and the RAN nodes 611 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 601 and the RAN nodes 611 may operate using LAA, eLAA, and/or feLAA mechanisms. In these implementations, the UEs 601 and the RAN nodes 611 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 601 RAN nodes 611, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 702.11 technologies. WLAN employs a contention-based channel access mechanism, called CSMA/CA. Here, when a WLAN node (e.g., a mobile station (MS) such as UE 601, AP 606, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 8 microseconds (μs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 601 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 601. The PDCCH carries information about the transport format and resource allocations related to the PDSCH channel, among other things. It may also inform the UEs 601 about the transport format, resource allocation, and HARQ information related to the uplink shared channel. Typically, downlink scheduling (assigning control and shared channel resource blocks to the UE 601b within a cell) may be performed at any of the RAN nodes 611 based on channel quality information fed back from any of the UEs 601. The downlink resource assignment information may be sent on the PDCCH used for (e.g., assigned to) each of the UEs 601.

The RAN 610 is shown to be communicatively coupled to a core network—in this embodiment, core network (CN) 620. The CN 620 may comprise a plurality of network elements 622, which are configured to offer various data and telecommunications services to customers/subscribers (e.g., users of UEs 601) who are connected to the CN 620 via the RAN 610. The components of the CN 620 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 620 may be referred to as a network slice, and a logical instantiation of a portion of the CN 620 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 7:
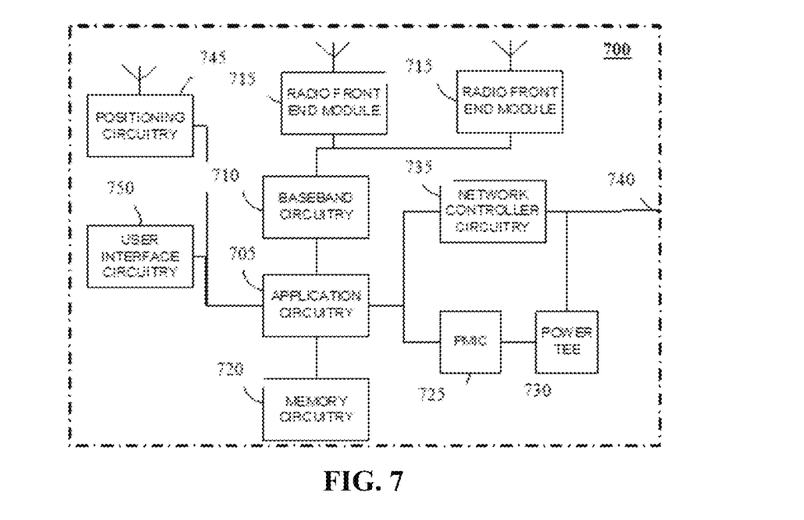
FIG. 7 illustrates an example of an infrastructure equipment device (e.g., BS, eNB, gNB), in accordance with various aspects disclosed.

FIG. 7 illustrates an example of infrastructure equipment 700 in accordance with various embodiments. The infrastructure equipment 700 (or "system 700") may be implemented as a base station, radio head, RAN node such as the RAN nodes 611 and/or AP 606 shown and described previously, application server(s) 630, and/or any other element/device discussed herein. In other examples, the system 700 could be implemented in or by a UE.

The system 700 includes application circuitry 705, baseband circuitry 710, one or more radio front end modules (RFEMs) 715, memory circuitry 720, power management integrated circuitry (PMIC) 725, power tee circuitry 730, network controller circuitry 735, network interface connector 740, satellite positioning circuitry 745, and user interface 750. In some embodiments, the device 700 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 705 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 705 may be coupled with or may include memory/storage elements and may be configured to execute instructions stored in the memory/storage to enable various applications or operating systems to run on the system 700. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 705 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 705 may comprise, or may be, a special-purpose processor/controller to operate according to the various embodiments herein. As examples, the processor(s) of application circuitry 705 may include one or more Apple® processors, Intel® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 700 may not utilize application circuitry 705, and instead may include a special-purpose processor/controller to process IP data received from an EPC or 5GC, for example.

User interface circuitry 750 may include one or more user interfaces designed to enable user interaction with the system 700 or peripheral component interfaces designed to enable peripheral component interaction with the system 700. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The components shown by FIG. 7 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an I2C interface, an SPI interface, point to point interfaces, and a power bus, among others.

Figure 8:
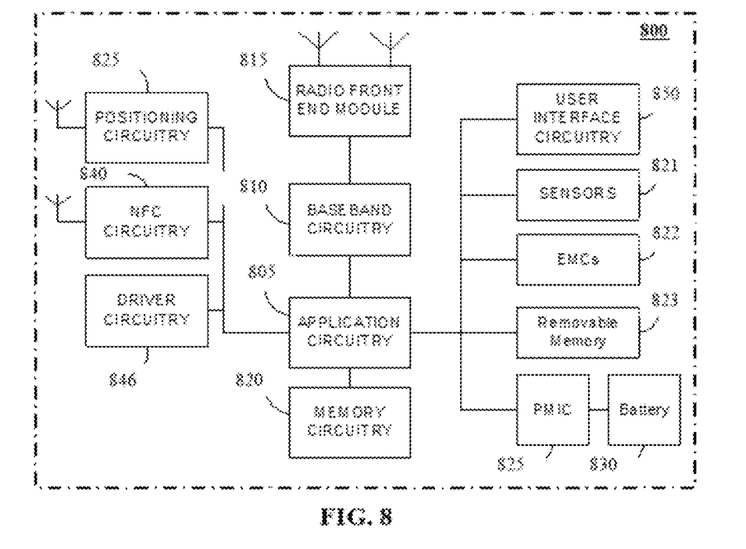
FIG. 8 illustrates an example of a user equipment device (e.g., UE), in accordance with various aspects disclosed.

FIG. 8 illustrates an example of a platform 800 (or "device 800") in accordance with various embodiments. In embodiments, the computer platform 800 may be suitable for use as UEs 101, 601, application servers 630, and/or any other element/device discussed herein. The platform 800 may include any combinations of the components shown in the example. The components of platform 800 may be implemented as integrated circuits (ICs), portions thereof, discrete electronic devices, or other modules, logic, hardware, software, firmware, or a combination thereof adapted in the computer platform 800, or as components otherwise incorporated within a chassis of a larger system. The block diagram of FIG. 8 is intended to show a high level view of components of the computer platform 800. However, some of the components shown may be omitted, additional components may be present, and different arrangement of the components shown may occur in other implementations.

Application circuitry 805 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 805 may be coupled with or may include memory/storage elements and may be configured to execute instructions stored in the memory/storage to enable various applications or operating systems to run on the system 800. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

As examples, the processor(s) of application circuitry 805 may include a general or special purpose processor, such as an A-series processor (e.g., the A13 Bionic), available from Apple® Inc., Cupertino, CA or any other such processor. The processors of the application circuitry 805 may also be one or more of Advanced Micro Devices (AMD) Ryzen® processor(s) or Accelerated Processing Units (APUs); Core processor(s) from Intel® Inc., Snapdragon™ processor(s)

from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 805 may be a part of a system on a chip (SoC) in which the application circuitry 805 and other components are formed into a single integrated circuit, or a single package.

The baseband circuitry 810 may be implemented, for example, as a solder-down substrate including one or more integrated circuits, a single packaged integrated circuit soldered to a main circuit board or a multi-chip module containing two or more integrated circuits.

The platform 800 may also include interface circuitry (not shown) that is used to connect external devices with the platform 800. The external devices connected to the platform 800 via the interface circuitry include sensor circuitry 821 and electro-mechanical components (EMCs) 822, as well as removable memory devices coupled to removable memory circuitry 823.

A battery 830 may power the platform 800, although in some examples the platform 800 may be mounted deployed in a fixed location, and may have a power supply coupled to an electrical grid. The battery 830 may be a lithium ion battery, a metal-air battery, such as a zinc-air battery, an aluminum-air battery, a lithium-air battery, and the like. In some implementations, such as in V2X applications, the battery 830 may be a typical lead-acid automotive battery.

While the methods are illustrated and described above as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or examples of the disclosure herein. Also, one or more of the acts depicted herein may be carried out in one or more separate acts and/or phases. In some examples, the methods illustrated above may be implemented in a computer readable medium using instructions stored in a memory. Many other examples and variations are possible within the scope of the claimed disclosure.

EXAMPLES

Example 1 is a user equipment (UE) device, including a processor configured to perform operations including receiving, from a base station (BS), control information that indicates i) time domain resources for communication of at least two physical downlink shared channel (PDSCH) or at least two physical uplink shared channel (PUSCH) transmissions and ii) at least one repetition number indicating a number of times each of the at least two PDSCH/PUSCH transmissions is repeated; and configuring operation to receive the at least two PDSCH transmissions or to transmit the at least two PUSCH transmissions based on the time domain resources and repetition number.

Example 2 includes the subject matter of example 1, including or omitting optional subject matter, wherein the processor is configured to perform operations including identifying indication of a single repetition number in the control information, wherein single repetition number is associated with all of the at least two PDSCH/PUSCH transmissions; and configuring operation to receive the at least two PDSCH transmissions, each repeated based on the single repetition number, or to transmit the at least two PUSCH transmissions, each repeated based on the single repetition number.

Example 3 includes the subject matter of example 1, including or omitting optional subject matter, wherein the processor is configured to perform operations including identifying, in the control information, indication of a respective repetition number associated with each respective one of the at least two PDSCH/PUSCH transmissions; and configuring operation to receive the at least two PDSCH transmissions, each repeated based on the associated repetition number, or to transmit the at least two PUSCH transmissions, each repeated based on the associated repetition number.

Example 4 includes the subject matter of example 1, including or omitting optional subject matter, wherein the indication of at least one repetition number is configured by way of radio resource control (RRC) signaling.

Example 5 includes the subject matter of example 4, including or omitting optional subject matter, wherein the indication of at least one repetition number is configured for each set of multiple PDSCH/PUSCH transmissions indicated by the control information.

Example 6 includes the subject matter of example 4, including or omitting optional subject matter, wherein the indication of at least one repetition number is configured for each PDSCH/PUSCH transmission in a set of multiple PDSCH/PUSCH transmissions indicated by the control information.

Example 7 includes the subject matter of examples 1-3, including or omitting optional subject matter, wherein the control information includes downlink control information (DCI).

Example 8 is a base station (BS), including a processor configured to perform operations including transmitting, to a user equipment wireless communication device (UE), control information that indicates i) time domain resources for communication of at least two physical downlink shared channel (PDSCH) or at least two physical uplink shared channel (PUSCH) transmissions and ii) at least one repetition number indicating a number of times each of the at least two PDSCH/PUSCH transmissions is repeated; and configuring operation to transmit the at least two PDSCH transmissions or to receive the at least two PUSCH transmissions based on the time domain resources and repetition number.

Example 9 includes the subject matter of example 8, including or omitting optional subject matter, wherein the processor is configured to perform operations including identifying indication of a single repetition number in the control information, wherein the single repetition number is associated with all of the at least two PDSCH/PUSCH transmissions; and configuring operation to transmit the at least two PDSCH transmissions, each repeated based on the single repetition number, or to receive the at least two PUSCH transmissions, each repeated based on the single repetition number.

Example 10 includes the subject matter of example 8, including or omitting optional subject matter, wherein the processor is configured to perform operations including identifying, in the control information, indication of a respective repetition number associated with each respective one of the at least two PDSCH/PUSCH transmissions; and configuring operation to transmit the at least two PDSCH transmissions, each repeated based on the associated repetition number, or to receive the at least two PUSCH transmissions, each repeated based on the associated repetition number.

Example 11 includes the subject matter of examples 8-10, including or omitting optional subject matter, wherein the indication of at least one repetition number is configured by way of radio resource control (RRC) signaling.

Example 12 includes the subject matter of example 11, including or omitting optional subject matter, wherein the indication of at least one repetition number is configured for each set of multiple PDSCH/PUSCH transmissions indicated by the control information.

Example 13 includes the subject matter of example 11, including or omitting optional subject matter, wherein the indication of at least one repetition number is configured for each PDSCH/PUSCH transmission in a set of multiple PDSCH/PUSCH transmissions indicated by the control information.

Example 14 includes the subject matter of examples 8-10, including or omitting optional subject matter, wherein the control information includes downlink control information (DCI).

Example 15 is a method, including receiving, from a base station, control information that indicates i) time domain resources for communication of at least two physical downlink shared channel (PDSCH) or at least two physical uplink shared channel (PUSCH) transmissions and ii) at least one repetition number indicating a number of times each of the at least two PDSCH/PUSCH transmissions is repeated; and configuring operation to receive the at least two PDSCH transmissions or to transmit the at least two PUSCH transmissions based on the time domain resources and repetition number.

Example 16 includes the subject matter of example 15, including or omitting optional subject matter, further including identifying indication of a single repetition number in the control information, wherein the single repetition number is associated with all of the at least two PDSCH/PUSCH transmissions; and configuring operation to receive the at least two PDSCH transmissions, each repeated based on the single repetition number, or to transmit the at least two PUSCH transmissions, each repeated based on the single repetition number.

Example 17 includes the subject matter of example 15, including or omitting optional subject matter, further including identifying indication of at least two repetition numbers in the control information, wherein each respective repetition number is associated with a respective one of the at least two PDSCH/PUSCH transmissions; and configuring operation to receive the at least two PDSCH transmissions, each repeated based on the associated repetition number, or to transmit the at least two PUSCH transmissions, each repeated based on the associated repetition number.

Example 18 is a method, including transmitting, to a user equipment wireless communication device (UE), control information that indicates i) time domain resources for communication of at least two physical downlink shared channel (PDSCH) or at least two physical uplink shared channel (PUSCH) transmissions and ii) at least one repetition number indicating a number of times each of the at least two PDSCH/PUSCH transmissions is repeated; and configuring operation to transmit the at least two PDSCH transmissions or to receive the at least two PUSCH transmissions based on the time domain resources and repetition number.

Example 19 includes the subject matter of example 18, including or omitting optional subject matter, further including identifying indication of a single repetition number in the control information, wherein the single repetition number is associated with all of the at least two PDSCH/PUSCH transmissions; and configuring operation to transmit the at least two PDSCH transmissions, each repeated based on the repetition number, or to receive the at least two PUSCH transmissions, each repeated based on the repetition number.

Example 20 includes the subject matter of example 18, including or omitting optional subject matter, further including identifying indication of at least two repetition numbers in the control information, wherein each respective repetition number is associated with a respective one of the at least two PDSCH/PUSCH transmissions; and configuring operation to transmit the at least two PDSCH transmissions, each repeated based on the associated repetition number, or to receive the at least two PUSCH transmissions, each repeated based on the associated repetition number.

Example 21 is a baseband processor including a processor configured to perform operations including receiving, from a base station, control information that indicates i) time domain resources for communication of at least two physical downlink shared channel (PDSCH) or at least two physical uplink shared channel (PUSCH) transmissions and ii) at least one repetition number indicating a number of times each of the at least two PDSCH/PUSCH transmissions is repeated; and configuring operation to receive the at least two PDSCH transmissions or to transmit the at least two PUSCH transmissions based on the time domain resources and repetition number.

Example 22 includes the subject matter of example 21, including or omitting optional subject matter, further configured to perform operations including identifying indication of a single repetition number in the control information, wherein the single repetition number is associated with all of the at least two PDSCH/PUSCH transmissions; and configuring operation to receive the at least two PDSCH transmissions, each repeated based on the single repetition number, or to transmit the at least two PUSCH transmissions, each repeated based on the single repetition number.

Example 23 includes the subject matter of example 21, including or omitting optional subject matter, further configured to perform operations including identifying indication of at least two repetition numbers in the control information, wherein each respective repetition number is associated with a respective one of the at least two PDSCH/PUSCH transmissions; and configuring operation to receive the at least two PDSCH transmissions, each repeated based on the associated repetition number, or to transmit the at least two PUSCH transmissions, each repeated based on the associated repetition number.

Example 24 is a baseband processor including a processor configured to perform operations including transmitting, to a user equipment wireless communication device (UE), control information that indicates i) time domain resources for communication of at least two physical downlink shared channel (PDSCH) or at least two physical uplink shared channel (PUSCH) transmissions and ii) at least one repetition number indicating a number of times each of the at least two PDSCH/PUSCH transmissions is repeated; and configuring operation to transmit the at least two PDSCH transmissions or to receive the at least two PUSCH transmissions based on the time domain resources and repetition number.

Example 25 includes the subject matter of example 24, including or omitting optional subject matter, further configured to perform operations including identifying indication of a single repetition number in the control information, wherein the single repetition number is associated with all of the at least two PDSCH/PUSCH transmissions; and configuring operation to transmit the at least two PDSCH transmissions, each repeated based on the repetition number, or to receive the at least two PUSCH transmissions, each repeated based on the repetition number.

Example 26 includes the subject matter of example 24, including or omitting optional subject matter, further configured to perform operations including identifying indication of at least two repetition numbers in the control information, wherein each respective repetition number is associated with a respective one of the at least two PDSCH/PUSCH transmissions; and configuring operation to transmit the at least two PDSCH transmissions, each repeated based on the associated repetition number, or to receive the at least two PUSCH transmissions, each repeated based on the associated repetition number.

The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A user equipment (UE), comprising a memory and a processor configured to:
  receive, from a base station (BS), control information that indicates a row of a pre-configured time domain resource allocation (TDRA) table, wherein each row of the TDRA includes i) at least two cells defining time domain resources for communication of at least two respective physical downlink shared channel (PDSCH) or physical uplink shared channel (PUSCH) transmissions and ii) at least one repetition number indicating a number of times each of the at least two PDSCH/PUSCH transmissions is repeated; and
  receive the at least two PDSCH transmissions or transmitting the at least two PUSCH transmissions based on the time domain resources and the at least one repetition number.

2. The UE of claim 1, wherein the processor is configured to:
  identify a repetition number in the row associated with all of the at least two PDSCH/PUSCH transmissions in the row; and
  receive the at least two PDSCH transmissions, each repeated based on the repetition number, or transmit the at least two PUSCH transmissions, each repeated based on the repetition number.

3. The UE of claim 1, wherein the processor is configured to:
  identify, in each cell of the row, a respective repetition number associated with each respective one of the at least two PDSCH/PUSCH transmissions; and
  receive the at least two PDSCH transmissions, each repeated based on the associated repetition number, or transmit the at least two PUSCH transmissions, each repeated based on the associated repetition number.

4. The UE of claim 1, wherein the processor is configured to receive a radio resource control (RRC) CONNECTION SETUP message that configures the TDRA table.

5. The UE of claim 1, wherein each row of the TDRA table includes a column that stores an indication of a repetition number.

6. The UE of claim 1, wherein each cell of the TDRA table that configures a PDSCH/PUSCH transmission stores an indication of a repetition number for the PDSCH/PUSCH transmission.

7. The UE of claim 1, wherein the control information comprises downlink control information (DCI) that includes a TDRA Field Index value that selects a row of the TDRA table.

8. A base station (BS), comprising a memory and a processor configured to:
  transmit, to a user equipment (UE), control information that indicates a row of a pre-configured time domain resource allocation (TDRA) table, wherein each row of the TDRA includes i) at least two cells defining time domain resources for communication of at least two respective physical downlink shared channel (PDSCH) or physical uplink shared channel (PUSCH) transmissions and ii) at least one repetition number indicating a number of times each of the at least two PDSCH/PUSCH transmissions is repeated; and
  transmit the at least two PDSCH transmissions or receiving the at least two PUSCH transmissions based on the time domain resources and the at least one repetition number.

9. The BS of claim 8, wherein the processor is configured to:
  identifying a repetition number in the row, associated with all of the at least two PDSCH/PUSCH transmissions in the row; and
  transmit the at least two PDSCH transmissions, each repeated based on the single repetition number, or receive the at least two PUSCH transmissions, each repeated based on the single repetition number.

10. The BS of claim 8, wherein the processor is configured to:
  identify, in each cell of the row, a respective repetition number associated with each respective one of the at least two PDSCH/PUSCH transmissions; and
  transmit the at least two PDSCH transmissions, each repeated based on the associated repetition number, or receive the at least two PUSCH transmissions, each repeated based on the associated repetition number.

11. The BS of claim 8, wherein the processor is configured to transmit a radio resource control (RRC) CONNECTION SETUP message that configures the TDRA table.

12. The BS of claim 8, wherein the each row of the TDRA table includes a column that stores an indication of a repetition number.

13. The BS of claim 8, wherein each cell of the TDRA table that configures a PDSCH/PUSCH transmission stores an indication of a repetition number for the PDSCH/PUSCH transmission.

14. The BS of claim 8, wherein the control information comprises downlink control information (DCI) that includes a TDRA Field Index value that selects a row of the TDRA table.

15. A method, comprising:

receiving, from a base station (BS), control information that indicates a row of a pre-configured time domain resource allocation (TDRA) table, wherein each row of the TDRA includes i) at least two cells defining time domain resources for communication of at least two respective physical downlink shared channel (PDSCH) or physical uplink shared channel (PUSCH) transmissions and ii) at least one repetition number indicating a number of times each of the at least two PDSCH/PUSCH transmissions is repeated; and receiving the at least two PDSCH transmissions or transmitting the at least two PUSCH transmissions based on the time domain resources and the at least one repetition number.

16. The method of claim 15, further comprising:
identifying a repetition number in the row associated with all of the at least two PDSCH/PUSCH transmissions in the row; and
receiving the at least two PDSCH transmissions, each repeated based on the repetition number, or transmitting the at least two PUSCH transmissions, each repeated based on the repetition number.

17. The method of claim 15, further comprising:
identifying, in each cell of the row, a respective repetition number associated with each respective one of the at least two PDSCH/PUSCH transmissions; and
receiving the at least two PDSCH transmissions, each repeated based on the associated repetition number, or transmitting the at least two PUSCH transmissions, each repeated based on the associated repetition number.

18. The method of claim 15, comprising receiving a radio resource control (RRC) CONNECTION SETUP message that configures the TDRA table.

19. The method of claim 15, wherein each row of the TDRA table includes a column that stores an indication of a repetition number.

20. The method of claim 15, wherein each cell of the TDRA table that configures a PDSCH/PUSCH transmission stores an indication of a repetition number for the PDSCH/PUSCH transmission.

* * * * *